(12) United States Patent
Spilo et al.

(10) Patent No.: US 6,298,422 B1
(45) Date of Patent: *Oct. 2, 2001

(54) METHOD FOR REDUCING THE MEMORY REQUIREMENTS FOR AN APPLICATION PROGRAM EXECUTING IN A MULTI-TASKING ENVIRONMENT

(75) Inventors: Michael L. Spilo; Jonathan A. Daub, both of New York, NY (US)

(73) Assignee: Network Associates, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/664,510

(22) Filed: Jun. 17, 1996

(51) Int. Cl.[7] .................................................. G06F 12/02
(52) U.S. Cl. .......................... 711/154; 711/151; 711/158; 709/106
(58) Field of Search ..................... 395/670, 672, 395/673; 711/104, 105, 151, 154, 158, 203; 709/100, 101, 102, 103, 104, 105, 106

(56) References Cited

U.S. PATENT DOCUMENTS 5,371,871 * 12/1994 Spilo ..................................... 711/154
5,533,175 * 7/1996 Lung et al. .
5,559,978 * 9/1996 Spilo ..................................... 711/203
5,664,095 * 9/1997 Cox et al. .
5,699,539 * 12/1997 Garber et al. .
5,765,157 * 6/1998 Lindholm et al. .

OTHER PUBLICATIONS

Jeffrey M. Richter, "Windows 3.1: A Developer's Guide", M&T Books, pp. 16, 19, 34, 65, 67, 373, 698, 1992.*

James L. Conger, "Windows API Bible", The Waite Group, Inc., pp. 30–31, 892–894, 1992.*

* cited by examiner

Primary Examiner—Majid A. Banankhah
(74) Attorney, Agent, or Firm—Darby & Darby (57) ABSTRACT

The invention provides a method for reducing the memory requirements and CPU cycle consumption of an executing program in a suspended state suspends the program by intercepting the entry points of the program. The contents of the memory occupied by the program and its data objects are then discarded or compressed, wherein the compressed data is stored at another region in the memory. The memory region containing the uncompressed data is then designated as free memory.

28 Claims, 4 Drawing Sheets

METHOD FOR REDUCING THE MEMORY REQUIREMENTS FOR AN APPLICATION PROGRAM EXECUTING IN A MULTI-TASKING ENVIRONMENT

The invention relates to a method for improving the efficiency of multitasking application programs in a microcomputer system. More particularly, the invention relates to a method for reducing the memory and CPU resources allocated to, running, inactive application programs.

BACKGROUND OF THE INVENTION

A principal advantage of a WINDOWS based operating system is its capability to enable a plurality of application programs to multitask or run simultaneously. However, only one of these programs owns the input focus at a time. The user determines which application has the input focus (the "active application"), and receives the user's keystrokes and mouse clicks. Applications which are running but do not have the input focus, are termed "inactive". Inactive applications are often "minimized" by a user, which action causes any visible windows belonging to the application to be hidden and the application to represented by a small picture (icon) or text representation, typically located in the bottom portion of the display, indicating that the application is running, but is not active. Frequently, a single active application is used by the user for an extended period of time, and the user does not switch to other running, inactive applications very often.

Applications that are running, but inactive continue to receive processor time and often continue to consume substantial quantities of system memory, including memory occupied by program code and data. Therefore, the existence of one or more running, inactive applications increases the load on the system resources (e.g., memory consumption and CPU usage), thus hampering the overall performance of the computer system.

An application may readily detect when it has been made inactive, and it has the ability to reduce its contribution to overall system load in a number of ways, including: causing at least a portion of its memory to be discarded or deallocated; marking its pageable data segments as candidates to be paged out by the virtual memory manager; releasing desktop or display resources that are not necessary while it is inactive; and reducing its processor usage by disabling timers, ceasing background execution, etc. However, application programs often do not take any of these steps to reduce consumption of system resources. One reason for this is that releasing system resources may increase the time needed to reactivate the application. Additionally, the steps that may be taken to reduce an application's system load are dependent on the programmers who designed the application, are therefore specific to that application, and do not usually apply to other application programs that may be contributing to the system load. Furthermore, the effort expended on reducing overhead may be wasted if the user intends to re-activate the application almost immediately.

An application's 16 or 32 bit program code and resource segments consume a significant portion of the system resources utilized by the application. Many such segments are provided with an attribute specifying that the segment is "discardable", in its entirety, at the discretion of the WINDOWS Kernel or at the request of the application program. When a segment is discarded, the memory that has been allocated to the segment is released to the operating system as free memory. Such segments contain readonly program code or resources, so the Kernel is able to reload or reconstitute the segment from its disk image contained in the programs's executable file, when it is needed. For 16 bit programs, these discardable segments are allocated from the WINDOWS Global Heap memory. For Win32 programs (32 bit programs), discardable segments are assigned to linear memory backed by a memory file mapping. The memory associated with these discardable segments in Win32 programs is available to be released by the WINDOWS memory manager to reduce overall consumption of system memory resources.

As for 16 bit programs, the Kernel only resorts to discarding when available linear memory is exhausted, which is an infrequent occurrence, because linear memory is generally abundant. Moreover, the Kernel discards discardable segments indiscriminately, whereby segments belonging to the active application are as likely to be discarded as those belonging to inactive applications. Additionally, because free physical memory is typically exhausted long before this compaction occurs, some portions of the application, including its discardable data, are likely to have been paged out to the virtual memory swap file. Because substantial portions of inactive applications may be accessed on a regular or frequent basis due to message handling of system messages and broadcasts, these portions are not likely to be paged out. Note that this is also applicable for 32 bit applications.

One prior art attempt to conserve system resources utilized by inactive programs is the program known as WinProbe, which is commercially available from QUARTERDECK. WinProbe is a system monitor program that presents to the user the status of various components of the operating system. Additionally, it provides a "memory optimizer", which causes the WINDOWS Global Heap to be "optimized" on an immediate basis, or at a settable interval for as long as WinProbe remains loaded. In order to optimize the heap, WinProbe issues a GlobalCompact call to the Kernel causing all discardable segments in the Global Heap to be discarded. But this approach has the drawback of requiring the user to execute a separate program in order to perform the compaction operation. It has a further drawback of causing all loaded segments to be discarded indiscriminately. Additionally, a percentage of these segments will have to be reloaded by the Kernel immediately as they are accessed by running programs. Yet a further drawback is that WinProbe has no effect on memory containing data or memory assigned to 32 bit processes.

Therefore, it is an object of the invention to conserve system resources consumed by running, inactive programs, while overcoming the drawbacks of prior art methods of doing so.

SUMMARY OF THE INVENTION

In accordance with the present invention, the efficiency and operating ability of multitasking application programs in the WINDOWS is improved by reducing the memory and CPU resources consumed by running, inactive application programs. The method of the invention, which is preferably user activated, suspends an application program by discarding and/or compressing the memory occupied by an application at the time it is minimized, or at the direction of the user, preferably by selection of a button in the title bar of the application or some other similar program object.

In a preferred embodiment, the method for reducing the memory requirements and CPU cycle consumption of an executing program in a suspended state suspends the program by intercepting the entry points of the program. The contents of the memory occupied by the program and its data objects are then compressed, wherein the compressed data is stored at another region in the memory. The memory region containing the original, uncompressed data is then designated as free memory.

BRIEF DESCRIPTIONS OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENTS

It is often desirable to suspend a running application that has been inactive for an extended period of time. But, because it is difficult to predict the period of time an application will remain inactive, and because the consequence of an incorrect prediction often results in a substantial increase in the amount of time needed to reactivate the application, it is desirable to leave the decision to suspend the application to the user. Therefore, the invention provides a method enabling the user to suspend a running, inactive application.

The preferred embodiment of the invention provides, in the title bar of all applications capable of being suspended, a "suspending" button (e.g. an icon), which can be selected by the user to cause suspension of the application. Generally, the primary window of an application program contains a title bar containing several or all of the following elements: a system menu button, a title caption, and buttons to minimize and maximize the application. As will be mentioned further below, because suspending an application will include the step of causing it to be minimized, the "suspending" button of the invention is preferably positioned next to the "minimize" button (if any). But it is appreciated that the "suspending" button may be placed anywhere in the application's window. Additionally, the invention may cause a menu entry to be added to the application's system menu or other menus, that when selected, causes the application to be suspended. The suspending process may be activated by the other existing or specially created buttons, or by other means, such as automatically when an application looses focus, or when an application is idle for a period of time.

In order to activate the title bar "suspending" button, or system menu entry, the invention installs a Shell Event system callback hook using the SetWindowsHook function of the WINDOWS API. This invokes a callback procedure in the invention whenever a top level unowned window is created or destroyed. It is noted that a top level unowned window typically represents the Primary Window of an application. Because the Shell Event hook causes only significant events to be signaled to the callback procedure, it does not hamper the overall performance of the computer system. Alternatively, other callback hooks provided by SetWindowsHook may be monitored for this purpose, including the CBT Proc hook. When notified of the creation of a Primary Window, the method of the invention intercepts the window procedure of the Primary Window, in order to act on the message notifications sent by the system to the Primary Window, and activate the title bar "suspend" button. Alternatively, to receive these notifications, the method of the invention may monitor the Primary Window through the CallWndProc callback hook provided by SetWindowsHook.

Alternatively, an application may be suspended at the time a user causes it to be minimized through selection of the "minimize" button or otherwise as discussed above, instead of by selection of the title bar "suspend" button. In this event, the above callback hook and intercept procedures are used to obtain notification that the "minimize" button or system menu entry has been selected.

Figure 1A:
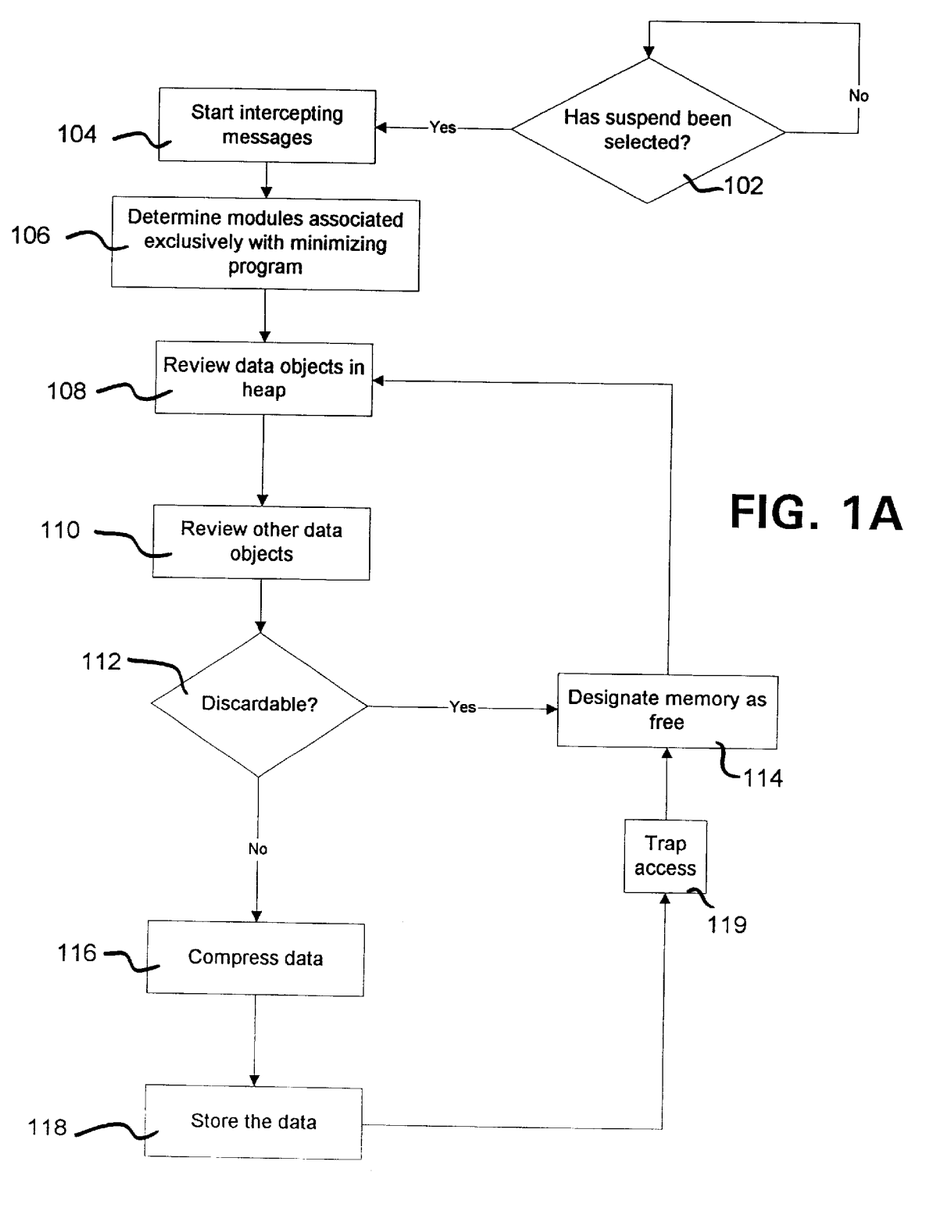
FIGS. 1A, 1B, 2 and 3 are flow diagrams depicting the method of the invention.

The flow chart of FIG. 1 illustrates the preferred method utilized by the present invention to reduce the use of system resources by an inactive application program. At step 102, a test is performed to determine whether the user has suspended an application, and control transfers to step 104 only after suspension has occurred.

In the event an application program, or other software, overlays the intercept window procedures that the method of the invention has installed, the application may not function properly or the intercept procedures may not be called. To avoid this, the method of the invention ensures that its window procedures are called first by intercepting the SetWindowLong and GetWindowLong functions of the WINDOWS User Interface (step 104). Calls to these functions are monitored for attempts to query or set the window procedure of any window that has been intercepted by the method of the invention. When either of these events occurs, the invention unhooks the window causing its prior window procedure to be active, reissues the function call, and on its return, rehooks the window.

When notification for "suspension" has been received, the method of the invention causes the running application to be minimized, then suspended and compressed. The application is minimized by sending to its Primary Window procedure the identical message that is sent when the user selects the "minimize" button or system menu entry. In order to ensure that the application will respond correctly to this message, the method of the invention provides that only Primary Windows having a "minimize" button or system menu entry may be suspended.

After an application has been minimized, the method of the invention suspends and compresses the application by initiating the following steps: (1) intercepting its window procedures (step 104); (2) intercepting its hook procedures; (3) detecting any other access to the application's memory; (4) identifying, discarding and compressing any unaccessed memory objects belong to the application, its libraries or subprocesses (steps 112 and 116); (5) freeing up discarded memory space (step 114); and storing compressed data (step 118) and freeing memory originally used for the uncompressed data in the same manner as discarded memory space. Each of these steps is discussed further below.

An application's window procedures are intercepted in order to inhibit the application from executing for the period of time that it is to be suspended. It is noted that minimized applications continue to receive certain messages and broadcasts sent by the Windows User Interface in addition to messages representing any periodic alarms that the application has been installed. These messages and broadcasts are processed in one or more code segments of the application and access the data of the application. Therefore, these messages and broadcasts can cause a significant portion of the application to be accessed on a regular or frequent basis. In order to reduce the application to the smallest memory image possible, the program is prevented from having to process these unneeded messages and alarms by intercepting its window procedures. Messages that are critical or private to the application, are preferably passed through to the window procedure if necessary to keep the application functioning properly.

Figure 2:
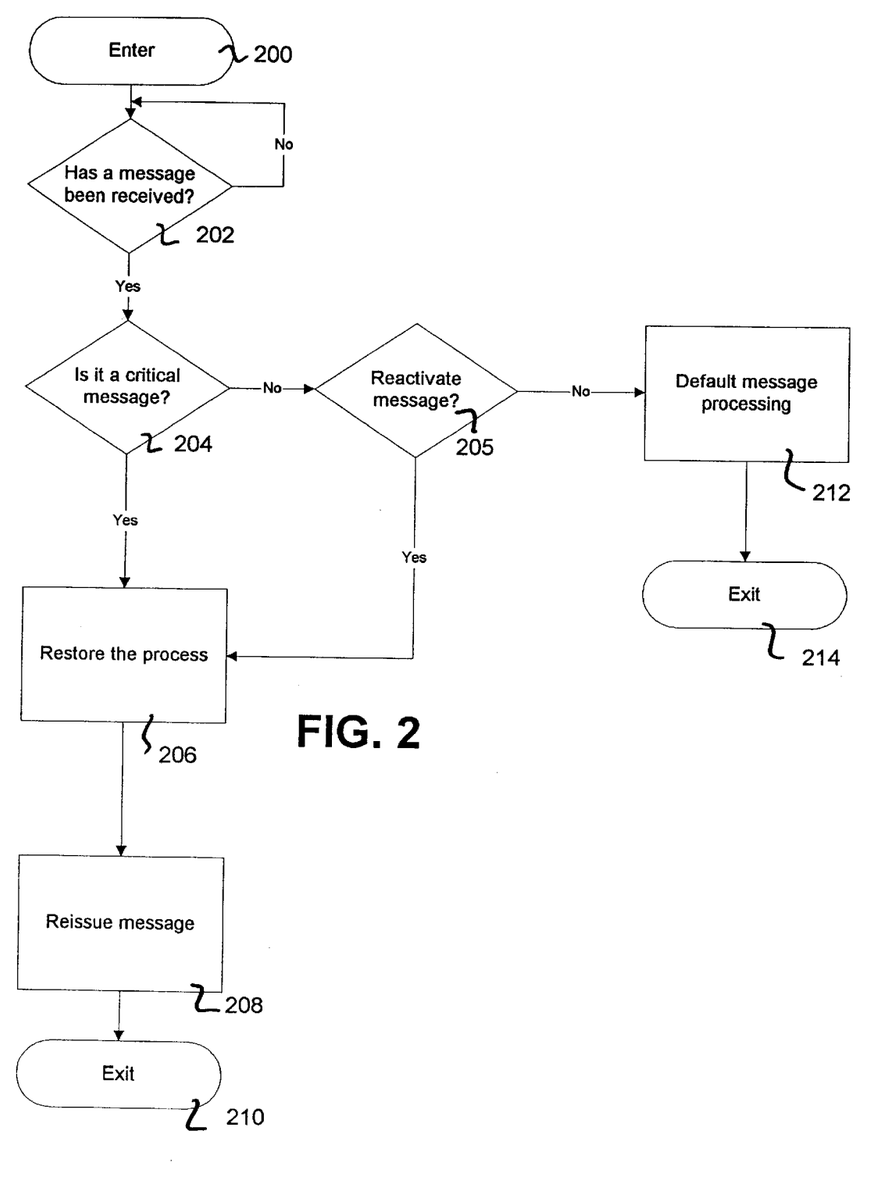

The flow chart of FIG. 2 illustrates how the invention intercepts an application's window procedures. The window procedures of all top level and child windows of the application are intercepted by the method of the invention and are redirected to a procedure that analyzes any messages received (step 202). Typically, the messages received by a window that has been minimized most likely contain notifications issued by the Windows User Interface component (USER) and may be safely disregarded. These messages are discarded by being passed through for default processing to the DefWindowProc function of USER (step 212). However, such messages may also include notification to reactivate the application due to user action. Reactivation messages are detected by the test at step 205, cause restoration of the process at step 206 and are reissued at step 208 to the inactive application's window procedure. It is noted that, by intercepting the window procedures of an application, the invention ensures that the application is prevented from consuming CPU time through any background processing it may have been performing, thereby allowing other active applications to run faster.

Preferably, callback procedures that have been installed by the application may also be intercepted by the invention. Such procedures may include callbacks installed through the SetWindowsHook function of the Windows API in addition to any system callbacks installed using the ToolHelp library.

Figure 3:
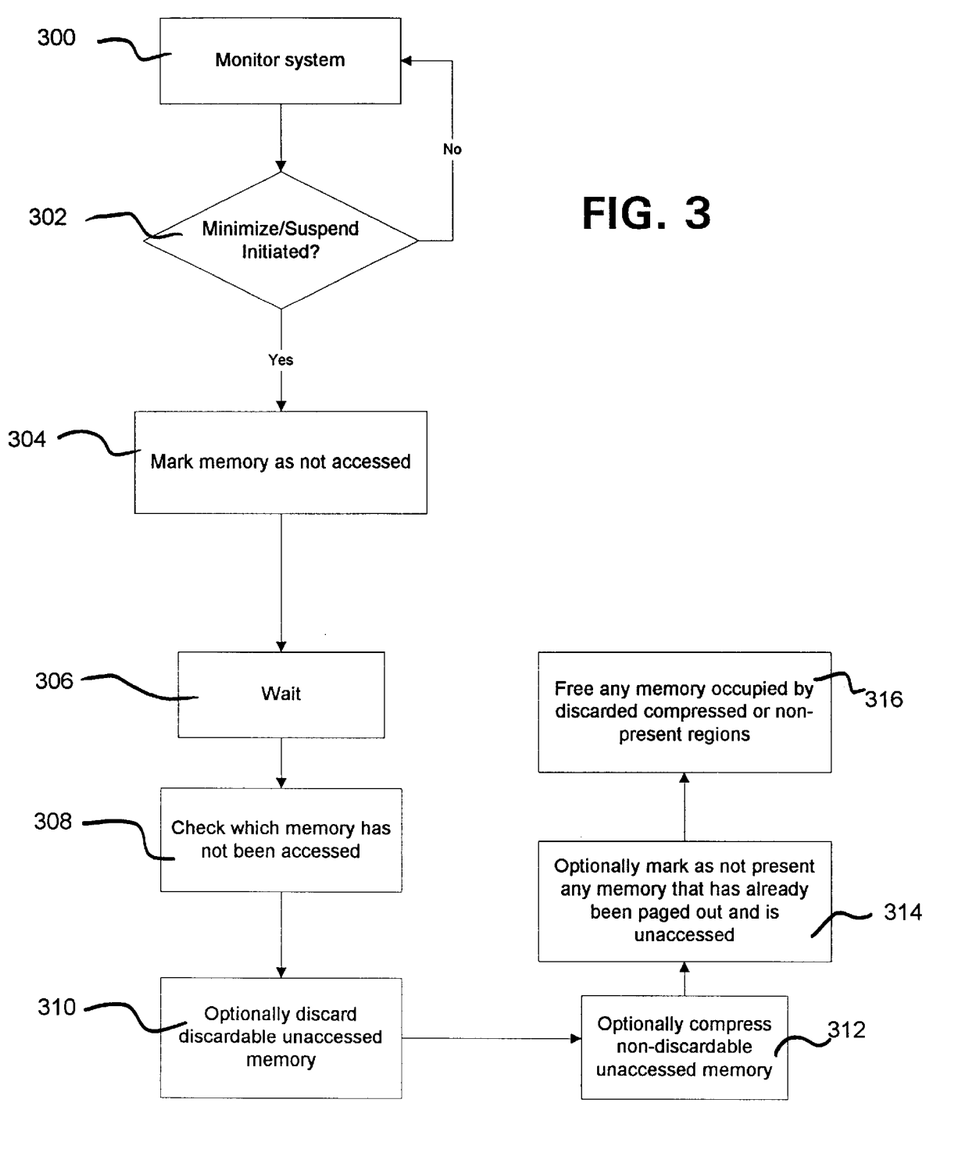

As described above, when requested, an application may be prevented from being executed through conventional methods. However, certain other methods exist for executing program code in the application and may not be inhibited efficiently or practically. For example: the application may install interrupt handlers using DPMI services; it may be called directly by a related process or library; or it may be called by a virtual device. The process illustrated in the flow chart of FIG. 3 is utilized by the invention to handle program segments executed by these other methods. In order to avoid discarding these segments (as they would need to be re-loaded immediately), program segments are monitored for any access which occurs after the window the window procedure has been intercepted. Before proceeding to discard and/or compress the application, the method of the invention detects any regular access to the memory that comprises the application. In this regard, a user adjustable, brief delay, typically of a few seconds, is implemented (step 306). The delay serves the additional purpose of allowing the user opportunity to cancel the suspending operation by reactivating the application if desired. At the commencement of the delay period, the segments and memory associated with the application, its libraries and subprocesses are marked as "unaccessed" (step 304). Regarding 16-bit segments, this is performed by resetting the "accessed" bit in the segment descriptor. Regarding 32-bit segments, the page table entries representing the memory are marked "unaccessed". When the delay period elapses, the descriptors and page table entries affected are checked to determine which segments and pages have been accessed during the delay period, if any (step 308). These accessed segments or pages will then not be discarded or compressed. Release and compression of memory resources occurs at steps 310–316.

Discarding or compression of 16 bit memory used by the application, its libraries or subprocesses comprising its 16 bit program segments and any loaded resources, but excluding any segments that have been accessed during the delay period above, will now be discussed. First, the method of the invention constructs a list enumerating the modules that comprise the application, its libraries and subprocesses. Any libraries in use by the application are tracked through the module import table in the application's module database. The reference count of these libraries indicating the number of times they have been loaded is used to determine whether they are in the exclusive use of the application or are being referenced simultaneously by other applications or processes. Subprocesses that are executing under the control of the application are identified by the subprocesses' owner contained in their task databases (FIG. 1, step 106).

The memory objects comprising the Windows Global Heap are iterated and a list is created enumerating the objects (the Eligible List) owned by any of the modules comprising the application, its libraries or subprocesses as determined above (step 108). This is accomplished by accessing directly the control structures and memory arenas of the Global Heap or through the alternative use of the ToolHelp functions GlobalFirst and GlobalNext. Each global memory object is identified by a selector (handle) maintained in a field of the memory arena for the object and returned by the ToolHelp functions. In addition, the memory arena contains an owner handle for the object which is a module handle or task handle or process database (PDB) and is also returned by ToolHelp. The owner handle is converted to be a module handle (if it is not already a module handle) by determining the module associated with the task handle or process database provided. It is noted that all task and process databases reference a unique module handle owner that is obtained by accessing a field in the structure. The owner module is then compared with the list of modules (as derived above) to determine whether the global memory object belongs to the application, its libraries or subprocesses. If yes, and if the segment for the object has been found to be unaccessed for the duration of the delay period as described above, then the object is considered eligible to be discarded or compressed and is added to the Eligible List (step 112). But objects that have been fixed in linear memory are considered ineligible in addition to other critical objects such as stacks, module headers, and etc.

The 16-bit memory objects enumerated in the above mentioned Eligible List are either discarded or compressed. Objects are identified as discardable by a reserved bit in the object's segment descriptor that has been set by the Windows Kernel at the time the object was created. Accordingly the method of the invention tests the reserved bit to determine whether an object is discardable (step 110). The contents of discardable objects are then caused to be discarded through use of the GlobalReAlloc function of the Kernel (step 114). All other memory objects are compressed by means of a data compression technique and the compressed data stored in a private memory space under control of the method of the invention (step 116 and 118) and access thereto is trapped (step 119). The original memory objects are then discarded, by modifying the segment descriptor of such objects to reflect that the segment is discidable (step 114). The actual discarding is performed by using the GlobalReAlloc function of the Kernel. Although the access checking means described above tends to reduce the possibility that a program segment is accessed while the application is inactive, such access may occur on the part of the inactive program or other process or libraries. If this occurs for a discardable code or resource segment, the Kernel will attempt to reallocate memory for the segment and to reload the contents of the segment from the executable image or reconstitute the resource. But it is noted that the Kernel is unable to reconstitute segments that have been compressed and discarded by the invention.

Figure 1B:
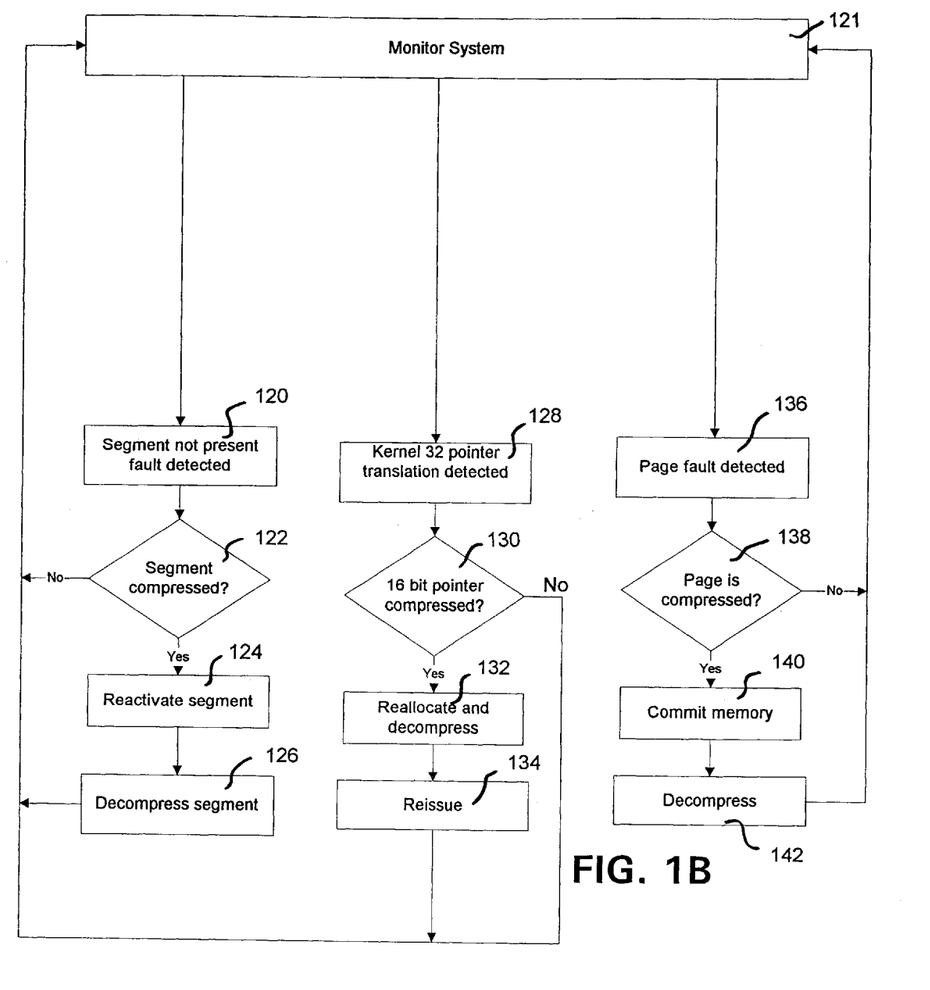

The flow chart of FIG. 1B illustrates how the invention reconstructs compressed memory. The system is continuously monitored at step 121 to detect certain conditions discussed more fully below. When the Kernel discards a segment, it causes the segment's memory object in the Global Heap to be freed and the segment selector is modified to be Not Present. When a Not Present segment is accessed, the processor issues a Segment Not Present fault whose default handler is supplied by the Kernel. Accordingly, the invention intercepts the Segment Not Present fault in order to trap accesses to segments whose contents have been compressed (step 120). This is done by installing a fault handler in a virtual device component of the invention that reflects the fault to the ring 3 component of the invention that processes the fault. Alternatively, DPMI may also be used to install a fault handler. Regardless of how the fault handler was installed, the fault handler receives the Not Present segment selector in the error code of the fault.

A bit table is used by the method of the invention to determine whether the selector passed refers to a compressed segment (step 122). If yes, the location in private storage of the compressed data is determined by accessing unused fields in the Not Present descriptor or through table means. Bits 0–39 and 48–63 of a Not Present descriptor are available for system or application use. At this time, the fault handler attempts to reallocate the segment to its original size prior to compression (step 124). The compressed data is then decompressed into the reallocated memory (step 126) and the private storage occupied by the compressed data is then deallocated.

In all other respects, the method of the invention provides that compressed, Not Present segments are processed as though they were Present by the application program and by the Kernel. Therefore, the invention intercepts a number of the Global Heap functions in order to monitor attempts by the application or other processes or libraries to manipulate or query a compressed segment. For example, these functions include: GlobalReAlloc; GlobalFree; GlobalLock; GlobalSize; GlobalHandle; GlobalFlags; LockSegment; LockResource; FreeResource; GlobalWire; GlobalFix and GlobalPageLock. When any of these functions is invoked with a compressed segment handle, the segment is decompressed and reconstituted as set forth above and the function call reissued.

When the method of the invention is implemented in MICROSOFT'S WINDOWS 95 additional steps are necessary. Certain WINDOWS 95 system and third party libraries, including the Object Linking and Embedding Library (OLE), consist of both 16 and 32 bit components. 32 bit libraries composed of Win32 code are occasionally required to access data contained in the Windows Global Heap, usually as the result of a 16 to 32 bit transition translating a 16:16 pointer in the Global Heap to a 32 bit flat offset. The portion of the Kernel32 component that translates such pointers does so with the assumption that the 16 bit segment is not discarded. Therefore, the invention intercepts the portion of Kernel32 that translates the pointers (step 128) in order to cause compressed and discarded 16 bit segments to be decompressed and made present (steps 130–134), thereby enabling the translation to take place correctly.

Further, Win32 applications are treated separately by the method of the invention due to their existence in a separate memory space. Win32 applications contain one or more modules or libraries which are obtained through the ToolHelp32 services, ModuleFirst and ModuleNext, although the invention may alternatively access directly the portable-executable (PE) module databases to obtain the library import table. 32-bit program modules consist of several segments as set forth in the PE documentation: memory mapped read only code or data; memory mapped pageable data; and pageable stack and heap. The invention accesses the segment table of the PE header of each module to analyze the contents of each segment. Physical memory committed to read only segments that were not accessed during the delay period above is discarded using DPMI. The pages comprising such segments will be reloaded automatically by the memory manger from their images in the PE file as necessary. Physical memory committed to pageable segments and the application's heap is subjected to a data compression technique on a page granular basis to provide that pages that have not been committed or have been paged out by the memory manager are not compressed. The compressed data for each page is stored in a private data area of the invention and the page table entry for the page is marked Not Present by a virtual device component of the invention. In order to provide that the pages can be reconstituted when they are accessed, the invention installs an invalid page fault handler in its virtual device component. The invalid page fault handler determines at the time of the fault whether the fault was caused by access of a compressed page by checking certain reserved bits in the page table entry for the faulting page. At the time the page is made Not Present, these bits are initialized to indicate an invalid type causing the WINDOWS VMM default page fault handler to take no action but to pass the page fault to a handler installed to process such faults. Such faults are detected at step 136. At step 138, it is determined whether page fault occurred on a compressed page and, if so, physical memory is committed to the page (step 140), then reflects the fault to its ring 3 component which reconstitutes its contents (step 142). The location of the compressed data in the private storage of the invention is stored in the unused bits of the Not Present page table entry In summary, a method for improving the efficiency of multitasking applications in a computer system has been described. Although the invention has been described with emphasis on particular embodiments for compressing the contents of the memory of an executing program in a suspended condition, it should be understood that the figures are for illustration of an exemplary embodiment of the invention and should not be taken as limitations or thought to be the only means of carrying out the invention. Further, it is contemplated that many changes and modifications may be made to the invention without departing from the spirit and scope of the invention as disclosed.

What is claimed is:

1. A method for reducing the memory requirements and CPU cycle consumption of an application program executing in a multitasking operating system the application having established system entry points, the method comprising the steps of:

suspending the application program by intercepting its entry points while it is executing;

at least one of discarding and compressing memory utilized by the application program; and releasing memory originally utilized by the application program for free use in the system.

2. The method of claim 1, further comprising the steps of:

monitoring access to compressed memory utilized by the application program;

allocating sufficient memory to hold the contents of the accessed compressed memory if uncompressed; and decompressing the contents of the accessed compressed memory to the allocated memory.

3. The method of claim 2, further comprising the step of freeing the accessed compressed memory for use in the system.

4. The method of claim 1 performed in an operating system in which an executing application program is capable of being minimized under user control, said method further comprising the step of causing said application program to be suspended at the same time said program is minimized through the direction of the user.

5. The method of claim 4 wherein said operating system is a windows-based multi-tasking operating system, said method further comprising the steps of:

monitoring a window representing a primary user interface of the application program to determine when said program is being minimized; and upon detecting that said program has been minimized, suspending said program.

6. The method of claim 5, wherein each window has an associated window procedure, the operating system having a SetWindowLong function for associating a particular data value with a particular window procedure and a GetWindowLong function for retrieving information about a particular window procedure, the method further comprising the step of monitoring said primary window by intercepting its window procedure while preventing said procedure from being overlaid by performing the steps of:

intercepting the window procedure for the window using the SetWindowLong function; and monitoring the SetWindowLong and GetWindowLong functions for other attempts to get or set said window procedure.

7. The method of claim 1 wherein the operating system is a windows-based multi-tasking operating environment, the application program having one or more associated windows, each window having an associated window procedure, said method further comprising the step of intercepting the window procedures for windows belonging to said application program.

8. The method of claim 7 further comprising the steps of:

enumerating the windows belonging to a task associated with said program; and for each enumerated window, intercepting the window procedure for that window.

9. The method of claim 8 further comprising the steps of:

monitoring said intercepted window for messages which are one of critical to said program, private to said program, and directing said program to be reactivated;

upon receiving critical or private messages for said program, reissuing the message to the intercepted window procedure;

upon receiving a message directing said program to be reactivated, unhooking the task windows by restoring the intercepted window procedures, then reissuing the message to the intercepted window procedure; and providing default action on other messages without reissuing the message.

10. The method of claim 1 wherein said operating system is a windows-based multi-tasking environment and includes a Global Heap, said discarding and compressing step comprising the steps of:

enumerating the objects contained in the Global Heap;

for each such numerated object, examining a memory arena maintained for the object and determining whether the object belongs to a task associated with the program; and determining whether the object is a discardable object if the object belongs to the task.

11. The method of claim 10 further comprising the steps of:

compressing said object;

allocating a separate memory space sufficient to hold said compressed object;

storing said compressed object in said separate memory space; setting said object as discardable; discarding said object through normal operations of the operating system.

12. The method according to claim 1, further comprising the step of providing a user-actuable program object for said application program which when actuated causes said suspending step.

13. The method of claim 12, wherein said operating system is a windows-based multi-tasking operating, said program object being at least one of a visible button and menu entry in the user interface of an application program, said method further comprising the steps of:

providing notification when a primary window representing the primary user interface of the application program has been created; and interacting with said primary window to provide in the user interface thereof said program object.

14. The method of claim 13, wherein the program object includes the menu entry and the button, the method further comprising the steps of:

adding said menu entry to a window system menu;

monitoring said primary window for system messages which would cause said window to redraw its user interface;

upon detecting such system messages, causing said button to be displayed after said window has been redrawn; and monitoring said primary window for messages pertaining to said button or said system menu.

15. The method of claim 1 further comprising the step of including among said utilized memory any memory occupied or allocated by libraries or subprocesses associated with said program.

16. The method of claim 15 further comprising the steps of, analyzing a library input table to determine libraries that are associated with said program; and determining for each such library whether said library is in the exclusive use of said program.

17. The method of claim 16 wherein said determining step is performed by examining a reference count of each library.

18. The method of claim 15 further comprising the steps of enumerating running task in the system;

for each such enumerated, obtaining a task owner which caused the enumerated task to be executed; and determining whether said task owner is the same as the task for said program.

19. The method of claim 6 further comprising the steps of:

upon detecting a SetWindowLong or GetWindowLong request with said window as a window parameter for the function, restoring a prior window procedure for the window;

reissuing the SetWindowLong or GetWindowLong request; and re-intercepting the window procedure for the window.

20. A method for determining noncritical portions of a particular application program running in an operating system, the program having memory usage indicators for memory indicating whether or not memory has been accessed, the program having established system entry points, said method comprising the steps of:

intercepting the entry points of the program;

resetting the memory usage indicators for the memory utilized by said program to an "unaccessed" state;

pausing for a selectable interval of time after said resetting step to allow the application program to execute through entry points other than said established system entry points; and examining said memory indicators to determine which area of memory have not been accessed.

21. The method of claim 20, further comprising at least one of the step of discarding and compressing said unaccessed portions.

22. A method for reducing the memory requirement for a particular 16 bit data object in a windows-based multitasking operating environment comprising the steps of:

compressing said particular object;

allocating a separate memory space sufficient to hold said compressed object;

storing said compressed object in said separate memory space;

setting said object as discardable; and discarding said object through normal operations of the operating environment.

23. The method of claim 22, wherein said operating environment has a segment-based memory management system, the method further comprising the steps of:

intercepting Segment Not Present faults;

determining on receipt of said fault whether the faulting segment is one of said discarded objects; if so, allocating sufficient memory to hold said discarded object in its original size through normal operating environment procedures; and decompressing said object into said allocated memory.

24. The method of claim 22 further comprising the steps of:

monitoring functions of a WindowsKernal that reallocate, lock and query a Global memory object to detect a request to reallocate, lock or query one of said discarded objects;

upon detecting such a request, allocating sufficient memory to hold the discarded object in its original size through normal operating system procedures; and restoring said object in said allocated memory.

25. The method of claim 22, wherein when said environment is a 32-bit operating system, the method further comprises the steps of:

intercepting those portions of a Kernel that converts a 16 bit segment by translating a 16:16 pointer to a 32 bit flat offset;

determining whether the 16 bit segment being converted is one of said discarded objects;

if so, allocating sufficient memory to hold said discarded object in its original size through normal operating environment; and restoring said discarded object in said allocated memory.

26. A method for reducing the memory requirement for a particular 32 bit data object in a windows-based multitasking operating system comprising the steps of:

compressing said particular object;

allocating a separate memory space sufficient to hold said compressed object;

storing said compressed object in said separate memory space;

discarding memory originally committed to said object, modifying page table entries associated with said data object to indicate for each page that the page is not present; and monitoring attempts to access said pages associated with said page table entries.

27. The method of claim 26 further comprising the steps of:

enumerating the pages comprising said data objects;

for each such page enumerated, determining whether the pages are committed and present; and if a respective enumerated page is committed and present, compressing and discarding said page.

28. The method of claim 26 further comprising the steps of:

intercepting page faults issued by the computer on which operating system is running;

determining on receipt of said fault whether the faulting not present page is of a compressed object;

if so, causing physical memory to be committed at the faulting address; and decompressing said compressed object into said committed memory.

* * * * *